May 28, 1935.  H. A. JACKSON  2,003,196
WELDING ELECTRODE HOLDER
Filed Dec. 7, 1933
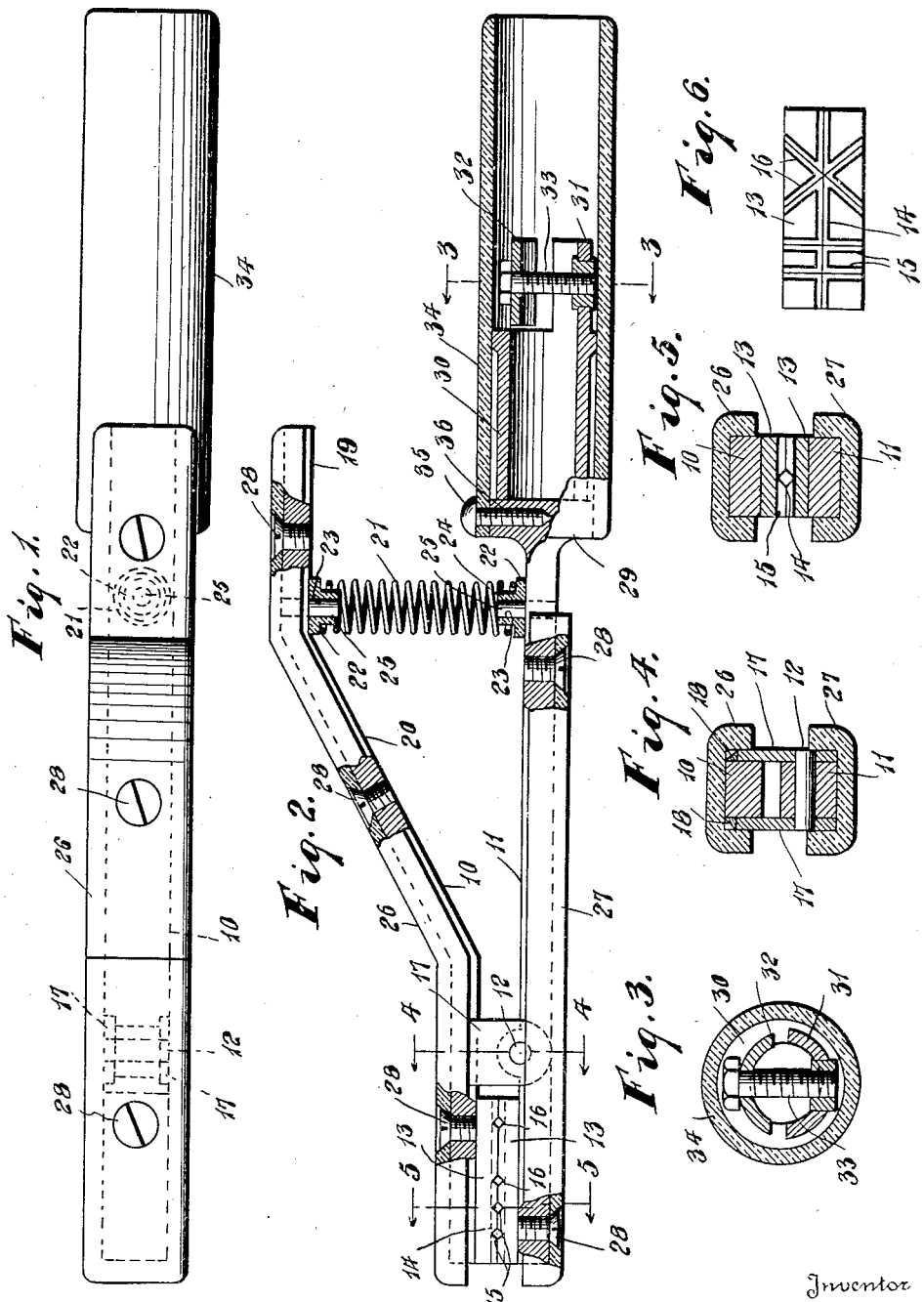
Inventor
H. A. Jackson Patented May 28, 1935

2,003,196

UNITED STATES PATENT OFFICE 2,003,196

WELDING ELECTRODE HOLDER

Honel A. Jackson, Detroit, Mich.

Application December 7, 1933, Serial No. 701,385

2 Claims. (Cl. 219—8)

The invention relates to tongs or holders for welding electrodes and has for its principal object the provision of means whereby the tongs are insulated so as to prevent breaking of the welding arc should the tongs contact with clamps holding the parts to be welded, or other metal parts, this sometimes happening in using tongs or holders of the ordinary type and retarding the speed of the welding as well as oftentimes proving dangerous to the operator by flying sparks. Furthermore the holder is so constructed that the operator may safely lay it down or hang it up on parts that are grounded without danger of being injured by flying sparks.

To this end the invention has for its object the provision of a holder or tongs that is covered by insulating material to protect the metal parts of the tool from contacting with grounded metal.

The invention also has for its object the provision of a welding electrode holder comprising spring actuated jaws in which the spring member is insulated from the jaw members to prevent arcing by contact of the spring with grounded parts.

A further object of the invention is the provision of a welding electrode holder having means whereby the welding cable connected with the source of electricity may be clamped to the holder or may be soldered to the holder as may be elected by the operator so as to accommodate the tool to use by operators preferring clamping the cable or soldering the cable as may be preferred.

The invention will be described in detail hereinafter and will be found illustrated in the accompanying drawing in which Figure 1 is a plan view of the improved welding electrode holder, Figure 2 is a side view partly broken away and shown in section, Figures 3, 4, and 5, are cross sectional detail views on planes indicated by the lines 3—3, 4—4, and 5—5, respectively, and Figure 6 is a plan view of one of the electrode clamping plates.

In the drawing similar reference characters are used to designate corresponding parts in all of the views.

The improved welding electrode holder has jaw members 10 and 11 that are hingedly secured together as shown at 12, and each of said members is provided with an electrode clamping plate 13 that is preferably made of copper and brazed or otherwise intimately secured to the respective jaw members. The copper plates 13 have their meeting faces provided with a plurality of grooves that are preferably V-shape and oppositely disposed so as to clamp an electrode therein in varying positions relatively to the jaw members, one of the grooves 14 extending longitudinally of the plates and of the holder, while a pair of grooves 15 are arranged transversely of the plates, and either or both of them may be used for clamping an electrode so that it will project laterally at right angles from the holder, and the other grooves 16 arranged at oblique angles to the groove 14 and crossing, each of said grooves being adapted to receive an electrode and to hold it at an oblique angle to the sides of the jaw members, this arrangement of the grooves providing for arranging the electrode for the most convenient use of the holder as may be elected by the operator.

The hinging means for connecting the jaw members 10 and 11 include ears 17 that may be integral with the jaw member 10 or they may be welded to the jaw member 10 as shown at 18.

The jaw member 10 is spaced at a remote distance from the jaw member 11 at its rear end as shown at 19 and connected with the closed portion on which the plate 13 is secured by an inclined portion 20, and an expansible coil spring 21 is located between the portion 19 and the jaw member 11. As it is desirable that the spring member 21 shall be insulated from the jaw members 10 and 11, insulating washers 22 are provided to sustain the thrust of the ends of the spring 21, and said washers 22 are provided with openings 23 and reduced extensions 24 to receive pins 25 that are welded or otherwise secured to or integral with the respective jaw members 10 and 11.

On the outer sides of the jaw members 10 and 11 are secured channeled insulating members 26 and 27, respectively, and secured to the jaw members by means of screws 28 that are countersunk in the insulating members 26 and 27 so that their heads are spaced inwardly of the outer surface of the insulating member to prevent danger of arcing by contact of one of said screws with a grounded part.

The rear extremity of the jaw member 11 is provided with a circular enlargement 29 and secured thereto by welding or integral therewith is a socket 30 to receive the end of the electric cable for supplying the welding current to the holder. Socket 30 is provided with a rearwardly extending arcuate clamp member 31, and 32 designates a mating clamp member that is securable to the clamp member 31 by means of a bolt or other securing means 33. By this construction the operator may elect whether he wishes to secure the welding cable in the socket 30 by means of the clamp members 31, 32, and 33, or to secure the welding cable in the socket 30 by soldering it therein, some operators preferring the one method, and other operators preferring the other.

Secured to the enlargement 29 and enclosing the socket member 30 and clamp members 31, 32, and 33, is a tubular cover 34 of insulating material and secured in position by means of a screw 35 engaging in a threaded opening 36 in said enlargement 29. The tubular member 34 forms the handle of the tool and by providing the insulation 34 in conjunction with the insulating members 26 and 27, and by insulating the spring 21 by means of the insulating washers 22, it will be apparent that danger of short circuiting the current through tongs or holder and parts thereof, or arcing, is eliminated, thus adding to the safety of the operator in manipulating the implement.

What I claim is:—

1. A welding electrode holder, comprising pivotally connected jaw members having means to hold an electrode therebetween, channeled members of electrical insulating material secured to said jaw members, the legs of the channeled members overhanging the jaw members to partially surround the metallic parts of the jaw members to more adequately insulate such metallic parts, a coil spring normally holding the jaw members in electrode holding position, and an insulating washer mounted on each jaw member and terminally engaging said spring.

2. A welding electrode holder, comprising pivotally connected jaw members having means to hold an electrode therebetween, channeled members of electrical insulating material secured to the outer sides of said jaw members, the legs of the channeled members overhanging the jaw members to partially surround the metallic parts of the jaw members to more adequately insulate such metallic parts, an electric conductor securing member electrically connected with one of the jaw members, and a tubular handle member of electrical insulating material removably secured to said jaw member and enclosing said conductor securing member.

HONEL A. JACKSON